V. BARKER.
Green Corn-Cutter.

No. 159,741. Patented Feb. 16, 1875.

Witnesses:
Frank H. Jordan
F. Elmore Jordan

Inventor:
Volney Barker
By Wm. Henry Clifford
Att'y.

UNITED STATES PATENT OFFICE.

VOLNEY BARKER, OF OTISFIELD, MAINE.

IMPROVEMENT IN GREEN-CORN CUTTERS.

Specification forming part of Letters Patent No. 159,741, dated February 16, 1875; application filed November 13, 1874.

*To all whom it may concern:*

Be it known that I, VOLNEY BARKER, of Otisfield, in the county of Cumberland and State of Maine, have invented certain new and useful Improvements in Green-Corn Cutters; and I do hereby declare that the following is a full, clear, and exact description thereof, which will enable others skilled in the art to which it pertains to make and use the same, reference being had to the accompanying drawings and to the letters of reference marked thereon, which form a part of this specification.

Figure 1:
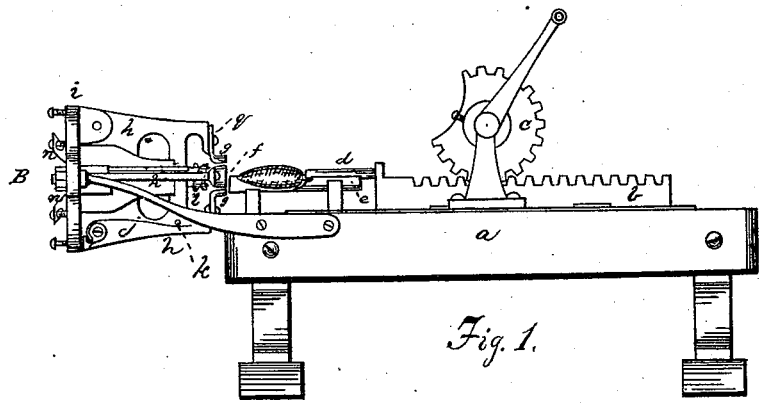
Figure 2:
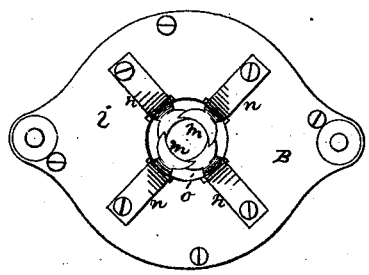
Figure 3:
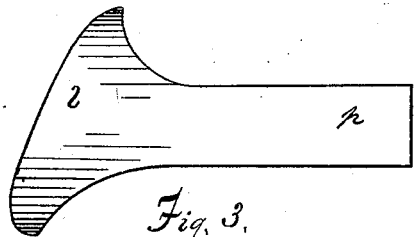
Figure 4:
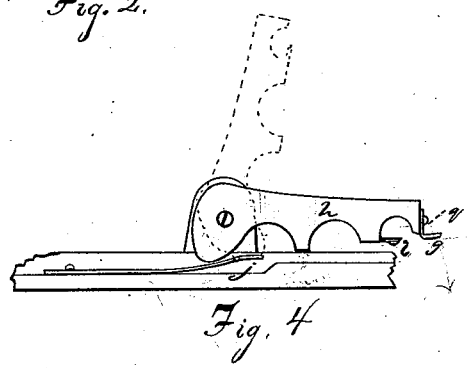
Figure 5:

Figure 1 is a side elevation of my invention. Fig. 2 is a front view of the head enlarged. Fig. 3 is an enlarged view of one of the cutting-knives. Fig. 4 is a modification. Fig. 5 is a detail of one of the spring-scrapers.

Same letters show like parts.

The purpose of my invention is to produce a machine for the cutting of green corn from the cob, preparatory to canning the same.

The operation consists, in brief, in guiding and forcing the ears through certain knives, which are arranged to remove the kernels; and also in further submitting the ear, with the kernels cut off, to a scraping device, whereby the juice or chit of the kernel is also removed and saved.

$a$ is the frame of the machine. $b$ shows a sliding rack, moving on guides or tracks attached to the frame $a$. The rack is moved backward and forward by the segmental gear $c$, which is operated by a crank or any other convenient means. $d$ is a rod on the forward end of the rack, which rod operates as a piston, as hereinafter described. This rod works over a trough or guide, $e$. This trough leads up to the aperture or opening $f$, formed by the flanges $g$ of the arms $h$, which hold the cutting and scraping tools. The arms $h$ are hinged or pivoted to a perforated back plate, $i$. They are held in the position shown in the drawings by means of springs or tongues $j$, which are attached to the back plate, $i$, and extend along the arms, passing over studs K. While the tendency of these springs is to keep the fore arms pressed together, it is obvious that they render the aperture $f$ adjustable to the different sizes of ears which are forced therein by the piston $d$. The cutting-knives $l$ are attached to the arms $h$, so as to form a circular space, into which the ear is pushed by the piston, and so that they will entirely surround the ear when it is forced into them; but, being attached to the adjustable arms $h$, the knives will be expanded or opened, so as to cut only the kernels from the various sizes of cobs which are pushed through them by the piston. The scraping devices are shown at $m$, and these are also hung on the springs $n$, which are also attached to the back plate, $i$. These also are arranged so as to form a circle. After leaving these devices $m$ the cob is forced through the aperture $o$, and drops down. The kernels and the chit, when separated from the cob, fall in front of the knives, and in front of the scrapers, into vessels prepared for their reception. The head B, which contains and combines the cutters and scrapers with the adjustable arms and springs, is held in such position relatively to the frame $a$ as to receive the rod or piston $d$ between the flanges $g$ and in the opening of the circle formed by the knives and scrapers. The knives are of the form shown in Fig. 3. They present an inclined edge to the kernels, and their parts $p$ are fitted into grooves formed in projecting parts on the arms $h$, as illustrated. Thus they may be easily removed when such an act becomes necessary for any purpose.

It is evident that the piston $d$ may be operated otherwise than by a rack and the segmental pinion, and I do not wish to limit myself to the exact method shown in the drawing.

As illustrated in Fig. 4, the arms, which carry the cutters $l$, can be made so as to turn backwardly to a horizontal position for cleansing or any other purpose, and so also expose the scrapers for any desired purpose.

The scrapers are adjustable by means of the springs, upon which they are set, bending back over the back plate, and there held by adjusting-screws. The flanges $g$ are also adjustable by means of slots and set-screws at $q$. The shanks of the knives are made dovetailed, and fit into flaring grooves in the projections on the knife-arms, and thus can be easily inserted and removed. The inclined edges, giving a drawing cut, require less force than if square. Moreover, the peculiar formation of the knives allows them to be placed in a circle without any of the set being placed in the rear of the others. The trough is divided, so that the rack passes onto it, and thus admits of the use of a short piston. The springs on the arms are also adjustable, so as to make them more or less rigid, as desired.

What I claim as my invention, and desire to secure by Letters Patent, is—

1. The pivoted spring-arms $h$, having the flanges $g$, and the knives $l$, as herein described.

2. The combination, with the trough $e$, slotted for the passage of the rack-bar, of the rod $d$ and cutters $l$, all arranged, combined, and operating as herein set forth.

3. The perforated back plate, $i$, provided with the pivoted spring-arms $h$, the knives $l$, and springs $j$, carrying the scrapers $m$, all combined and arranged to operate as herein set forth.

4. The combination of the rod $d$, the adjustable flanges $g$ on the pivoted spring-arms, the cutters $l$, and scrapers $m$, as and for the purposes herein set forth.

In testimony that I claim the foregoing as my own I affix my signature in presence of two witnesses.

VOLNEY BARKER.

Witnesses:
D. F. SCRIBNER,
JOHN W. NOBLE.